March 31, 1964     J. L. JEFFRIES     3,127,194
SAFETY DEVICE FOR FLUID CONDUITS EXTENDING BETWEEN VEHICLES
Filed Dec. 11, 1961     2 Sheets-Sheet 1

INVENTOR.
J. L. Jeffries
BY
William S. Dorman
ATTORNEY

March 31, 1964 J. L. JEFFRIES 3,127,194
SAFETY DEVICE FOR FLUID CONDUITS EXTENDING BETWEEN VEHICLES
Filed Dec. 11, 1961 2 Sheets-Sheet 2

INVENTOR.
J. L. Jeffries
BY
William S. Dorman
ATTORNEY

United States Patent Office

3,127,194
Patented Mar. 31, 1964

3,127,194
SAFETY DEVICE FOR FLUID CONDUITS
EXTENDING BETWEEN VEHICLES
Joseph L. Jeffries, P.O. Box 5216, Tulsa, Okla., assignor of one-half to Jack S. Burden, Tulsa, Okla.
Filed Dec. 11, 1961, Ser. No. 158,353
3 Claims. (Cl. 280—421)

This invention relates to improvements in vehicles, and more particularly, but not by way of limitation, to a safety device for the protection of air hoses, and the like, during the operation of the vehicle.

Many vehicles, particularly of the tractor and trailer type, utilize a plurality of conduits or hose members for conducting fluids necessary for the operation of the vehicle. Air hoses are frequently provided for directing air from compressors, or the like, to the vehicle brakes for actuation thereof. In addition, hoses are also frequently used for conducting hydraulic fluids for the steering mechanism and other hydraulically actuated devices. The source of supply of these various fluids is normally provided on the tractor portion of the vehicle, and the braking devices, or other equipment utilizing the fluids for the operation or functioning thereof may be disposed on the trailer portion of the vehicle. As a result, the hoses or conduits must extend between the tractor and trailer, and are often subjected to extreme stress and strain, particularly as the tractor and trailer turn independently of each other.

The independent movement between the tractor and trailer usually results in considerable twisting and stretching of the conduits, and chafing thereof. Of course, any break or damage to the conduits is a great disadvantage since the fluids may leak at the damaged area. Any loss of air in the air lines of the vehicle is particularly undesirable since the loss of air presure greatly reduces the efficiency of the braking action, and may cause serious accidents. Similarly, any loss of the hydraulic fluid may greatly reduce the operating efficiency of the equipment depending upon the fluids for functioning, and in the case of the steering mechanism, for example, the control of the vehicle may be greatly impaired. As a result, there have been many attempts to reduce the possibility of damage to the air hoses, and the like. The hoses are often suspended on the vehicle in such a manner as to reduce pinching or cutting thereof during operation of the vehicle in an attempt to improve the safety thereof, but this type of arrangement has not satisfactorily solved the problem, and any damage to the hoses is a great hazard to the vehicle.

The present invention contemplates a novel safety device for the protection of the various fluid hoses utilized on a vehicle. The novel device effectively encases the hoses in such a manner as to greatly reduce or substantially preclude kinking or pinching thereof during turning of the vehicle, and in addition, chafing or other wear on the outer periphery of the hoses is reduced to a minimum. The novel device generally comprises a rotatable sleeve for housing the hoses at the juncture between the tractor and trailer and is provided with a channel member for supporting the hoses in such a manner that the hoses move with the tractor or truck portion of the vehicle. Thus, the hoses are protected with substantially no stretching thereof, even upon a complete jack-knifing of the vehicle. Furthermore, the air hoses, or fluid hoses are contained within the device in such a manner that winch lines, and the like, cannot accidentally cut the hoses. The device may be readily installed on substantially any vehicle to increase the safety features thereof by assuring that the air hoses, and the like, will be protected against damage whereby the equipment carried by the vehicle, and vital to the over-all operation thereof, may be utilized with the maximum efficiency.

It is an important object of this invention to provide a device for increasing the over-all operating safety and efficiency of a vehicle.

It is another object of this invention to provide a novel safety device for the protection of fluid hoses on a vehicle for reducing the hazards inherent with breaking or damage to the hoses.

Another object of this invention is to provide a novel device for a vehicle which is particularly designed and constructed for substantially eliminating kinking and chafing of the air hoses, and the like, for increasing the safety of the operation of the vehicle.

Still another object of this invention is to provide a novel device for a vehicle for protecting the fluid hoses thereof from cutting or other damage from winch lines, and the like.

A further object of this invention is to provide a novel safety device for vehicles which may be readily installed on substantially any vehicle for reducing damage to the hoses utilized therewith.

A still further object of this invention is to provide a novel safety device for the protection of fluid hoses for vehicles which is simple and efficient in operation and economical and durable in construction.

Other and further objects and advantageous features of the present invention will hereinafter more fully appear in connection with a detailed description of the drawings in which.

Figure 2:
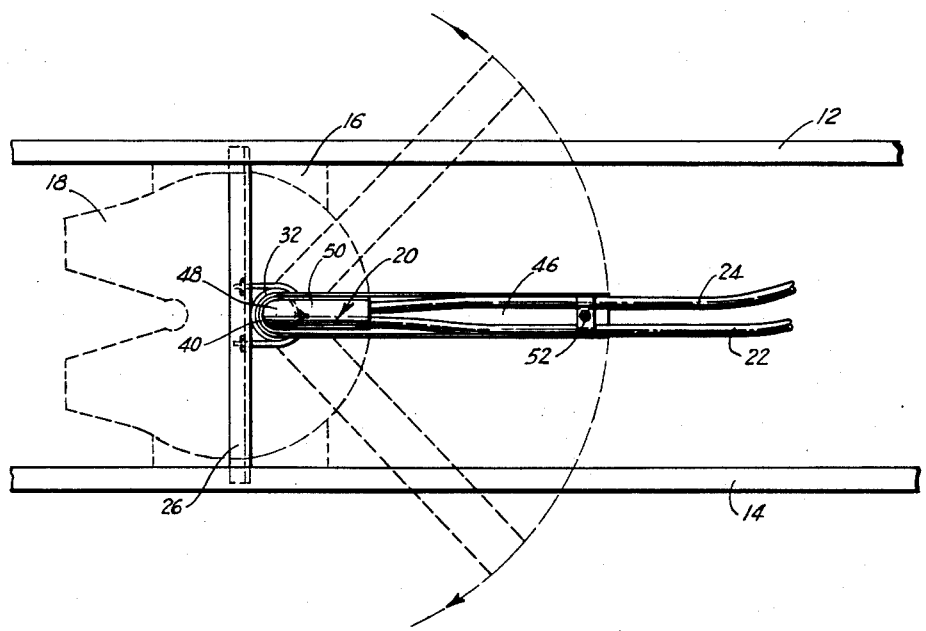
FIGURE 2 is a plan view of a safety device embodying the invention, with portions of the vehicle depicted in dotted lines for clarity.

Referring to the drawings in detail, reference character 10 generally indicates a truck or tractor portion of a vehicle having the usual longitudinally extending spaced frame members 12 and 14. A suitable cross member 16 (FIGURE 2) is normally rigidly secured or welded between the frame members 12 and 14 for supporting a conventional fifth wheel device 18. The fifth wheel device 18 is normally utilized for connecting the trailer portion (not shown) of the vehicle with the tractor portion 10 whereby the tractor 10 may rotate or turn independently of the trailer, as is well known.

Figure 3:
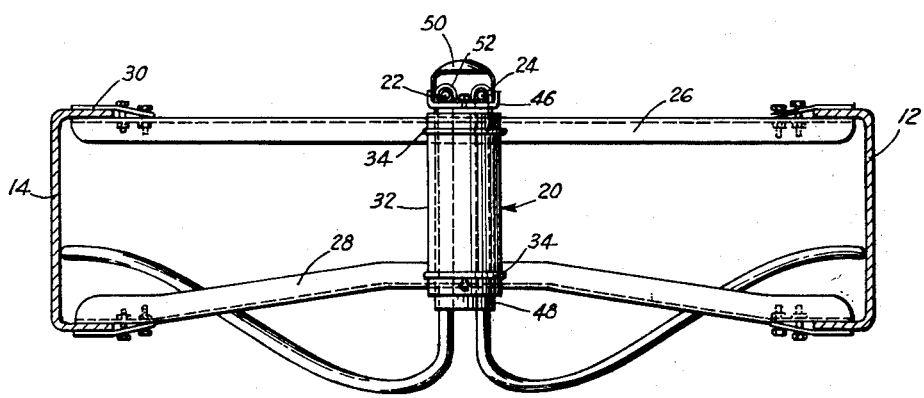
FIGURE 3 is a front elevational view of a safety device embodying the invention and depicting the vehicle frame structure in section.

A safety device 20 is interposed between the frame members 12 and 14 for receiving and supporting a plurality of conduits or hose members 22 and 24 normally extending between the tractor 10 and trailer portion of the vehicle. The device 20 is preferably disposed below the fifth wheel device 18 and may be substantially in alignment with the vertical rotational axis thereof, if desired, but is not limited thereto. The device 20 may be rigidly supported by an upper cross-bar member or mounting bracket 26 and a complementary lower cross-bar member 28 as clearly shown in FIGURE 3. The cross-bar members or brackets 26 and 28 are preferably constructed of angle iron, or the like, and may be secured to the frame members 12 and 14 by suitable clamping members 30, as is well known. Of course, the cross-bars or mounting bars 26 and 28 may be welded to the frame members 12 and 14, but is preferable to utilize the clamping members 30 in order to assure that the truck or vehicle frame structure will not in any manner be altered or weakened.

The safety device 20 comprises an outer sleeve or cylindrical housing 32 securely retained on the mounting brackets 26 and 28 by a plurality of U-clamps 34 which extend around the outer periphery of the housing 32 and are bolted or secured to the brackets 26 and 28 by the threaded ends 36 thereof and cooperating lock nut members 38, as is well known. An inner tubing or sleeve 40 is journalled within the outer sleeve 32 in any suitable manner (not shown) for independent rotation therein, and preferably extends slightly below the lower end of the outer housing 32 as clearly shown in FIGURE 1 for precluding contact of the hoses 22 and 24 with the lower end of the housing 32 in order that the hoses will be protected against any damage therefrom. The inner sleeve 40 also extends upwardly from the outer sleeve 32 and above the upper plane of the frame members 12 and 14 in order that the hoses 22 and 24, extending through the device 20, will be encased throughout the distance between the under portion of the frame members and the upper portion thereof. This assures protection of the hoses 22 and 24 which span the distance between the tractor 10 and trailer portion for directing the fluid to the brakes (not shown), or the like, normally provided on the trailer portion. A plurality of suitable grease fittings 42 may be provided in the side wall of the outer sleeve 32 in order that a lubricant (not shown) may be injected into the annular space 44 between the outer sleeve 32 and inner sleeve 40 for facilitating the free rotation of the inner sleeve 40.

Figure 1:
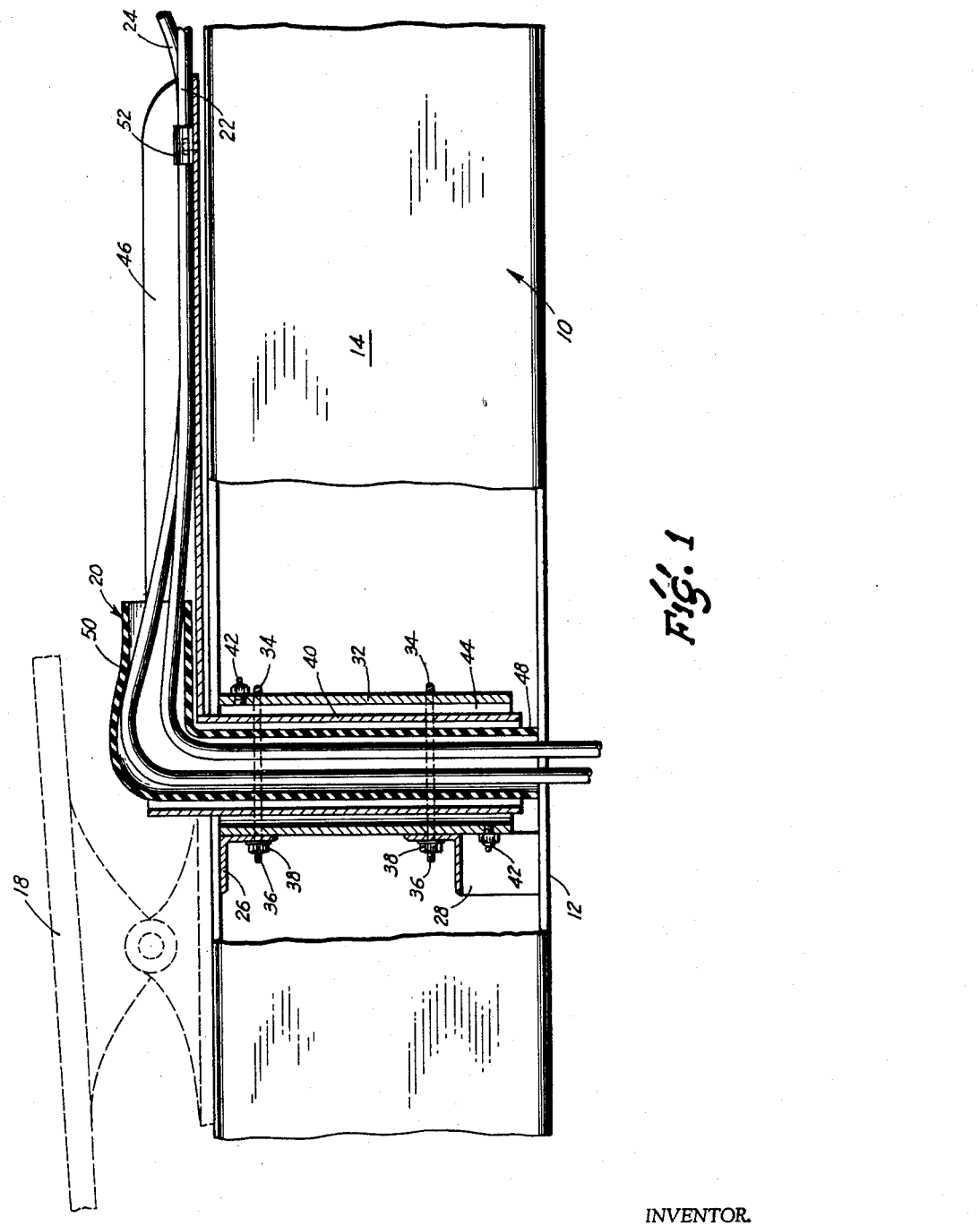
FIGURE 1 is a sectional elevational view of a safety device embodying the invention, with portions of the vehicle depicted in dotted lines for purposes of illustration.

A longitudinally extending channel member 46 is welded or otherwise rigidly secured to the upper end of the inner sleeve 40 and extends radially therefrom generally in a direction toward the trailer section of the vehicle 10 for a purpose as will be hereinafter set forth. A rubber or plastic liner 48 is disposed within the inner tube 40, and may be disposed either closely against the inner periphery thereof, or may be spaced therefrom and supported therein by any suitable means (not shown), as desired, for rotation simultaneously therewith. The rubber sleeve or liner 48 extends throughout the length of the inner sleeve 40 and to a position slightly below the lower edge thereof, as shown in FIGURE 1, for protecting the hoses 22 and 24 from contacting the sleeve 40 and precluding chafing or wear of the hoses which may result therefrom. The liner 48 extends upwardly within the sleeve 40 and is provided with a leg or angularly extending portion 50 disposed in the channel member 46. The hoses 22 and 24 extend upwardly through the liner 48 and through the angular portion 50 thereof for disposition in the channel member 46, as clearly shown in the drawings. It is preferable to provide a hose clamp or bracket 52 on the channel member 46 for securing the hoses 22 and 24 therein whereby the hoses will be retained in spaced relationship for further protection against chafing, wearing or abrasion on the outer periphery thereof.

The channel member 46, being integral with, or rigidly secured to the rotatable inner sleeve 40, swings or pivots freely simultaneously therewith in the direction of the forward portion or nose of the trailer section upon independent rotation or turning of the tractor 10 with respect thereto. Since the hoses 22 and 24 are secured within the carrier member 46, the hoses move simultaneously therewith to substantially preclude any stretching of the hoses, even in the event the vehicle accidentally jack-knifes during the operation thereof.

Operation

The safety device 20 may be quickly and easily installed on any suitable vehicle by clamping the mounting bars 26 and 28 between the spaced, longitudinally extending frame members 12 and 14. The outer sleeve 32 is secured to the mounting bracket by the U-clamps 34 whereby the device 20 is rigidly installed on the vehicle 10. The air hoses 22 and 24, or other fluid hoses, extend from the fluid supply source (not shown) provided on the truck or tractor section of the vehicle, and upwardly through the liner 48 to the channel 46. The hoses disposed in the channel or carrier member 46 are preferably securely clamped therein by the bracket 52, and extend from the outer extremity of the carrier member to the trailer for connection in the usual manner with the air brakes, or the like (not shown) which depend upon the fluid for actuation.

As the vehicle 10 moves along a highway or across the country side, the tractor section and trailer portion are normally subjected to a considerable amount of independent movent, and particularly of independent rotation therebetween, such as when the vehicle is turning a corner, or the like. When the tractor portion turns with respect to the trailer section, the hose carrier member 46 turns simultaneously with the trailer and in the same direction therewith. The rotation is transmitted to the inner sleeve 40 and liner 48 whereby the hoses 22 and 24 are protected against kinking, or sharp bending, stretching, abrasion or other damage. The liner 48 protects the outer periphery of the hoses from contact with damaging corner portions or sharp edges for greatly reducing any possible damage thereto. In addition, the hoses are retained in a spaced relationship in the channel or carrier member 46 for greatly reducing any external friction or chafing therebetween.

It has been found that even under extremely hazardous or undesirable operating conditions of the vehicle 10, such as during a complete jack-knifing thereof, the hoses 22 and 24 will be protected against stretching and damage. Furthermore, the safety device 20 precludes substantially any damage or cutting of the hoses by winch lines, and the like, which may be provided or utilized in conjunction with the vehicle 10. Thus, the hose members 22 and 24 are efficiently protected against substantially any damage during the operation of the vehicle for greatly increasing the safety factor of the vehicle. The damage of accidental breakage of the hoses is substantially eliminated, thus increasing the operating efficiency of the vehicle and auxiliary equipment thereon.

From the foregoing, it will be apparent that the present invention provides a novel safety device for substantially any vehicle, and particularly for a vehicle of the tractor and trailer type wherein a plurality of hoses extend between the independent tractor and trailer sections. The novel device may be quickly and easily installed on the vehicle without altering or changing the vehicle structure. The hoses extend through the device for protection from stretching, bending, kinking, chafing, and the like, to greatly decrease the possibility of accidental breakage of the hoses. Thus, the over-all safety of the vehicle is greatly increased. The novel safety device is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. In combination with a vehicle having a plurality of fluid hoses, a safety device adapted to be secured to the vehicle and comprising first sleeve means for encasing the hoses to provide protection therefor against accidental damage or abrasion, rotatable sleeve means journalled in the first sleeve means for receiving the hoses to preclude damage thereto from any turning action of the vehicle, support means carried by the rotatable sleeve means and extending outwardly therefrom for supporting the hoses, and means carried by the support means securing the hoses in spaced relation for reducing chafing of the outer periphery thereof during operation of the vehicle.

2. In combination with a vehicle having a plurality of fluid hoses carried thereby, a safety device for protection of the hoses and comprising mounting bracket means adapted to be secured to the vehicle, an outer housing carried by the mounting bracket means, an inner sleeve journalled in the outer housing for receiving the hoses therethrough, a liner disposed within the inner sleeve for protecting the hoses against abrasion, channel means secured to the inner sleeve for supporting the hoses, and means carried by the channel means for securing the hoses therein in spaced relation for reducing chafing therebetween.

3. In combination with a vehicle having a plurality of hoses carried thereby, a safety device for protection of the hoses and comprising mounting bracket means adapted to be secured to the vehicle, housing means rigidly secured to the bracket means, rotatable sleeve means journalled in the housing means for receiving the hoses therethrough, channel means secured to the rotatable sleeve means and extending outwardly therefrom for supporting the hoses in spaced relationship, and liner means disposed in the rotatable means for protecting the hoses against abrasion.

References Cited in the file of this patent
UNITED STATES PATENTS

| | | |
|---|---|---|
| 1,980,015 | Thompson | Nov. 6, 1934 |
| 2,374,249 | Wadsworth | Apr. 24, 1945 |
| 2,480,413 | Kirksey | Aug. 30, 1949 |